US012678830B2

(12) United States Patent
Nakamura

(10) Patent No.: US 12,678,830 B2
(45) Date of Patent: Jul. 14, 2026

(54) CLEANING ASSEMBLY

(71) Applicant: DISCO CORPORATION, Tokyo (JP)

(72) Inventor: Masaru Nakamura, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 344 days.

(21) Appl. No.: 17/934,024

(22) Filed: Sep. 21, 2022

(65) Prior Publication Data

US 2023/0115306 A1 Apr. 13, 2023

(30) Foreign Application Priority Data

Oct. 4, 2021 (JP) ................................ 2021-163447

(51) Int. Cl.

| | |
|---|---|
| ***B08B 1/12*** | (2024.01) |
| ***B08B 1/20*** | (2024.01) |
| ***B08B 1/36*** | (2024.01) |
| ***B08B 13/00*** | (2006.01) |

(52) U.S. Cl.

CPC .................. *B08B 1/12* (2024.01); *B08B 1/20* (2024.01); *B08B 1/36* (2024.01); *B08B 13/00* (2013.01)

(58) Field of Classification Search

CPC .. B24B 41/00; B08B 3/02; B08B 1/32; B08B 1/12; B08B 13/00; B08B 1/20

USPC ........................................................... 15/21.1

See application file for complete search history.

(56) References Cited

U.S. PATENT DOCUMENTS

| | | | | |
|---|---|---|---|---|
| 5,890,251 A * | 4/1999 | Terui | H01L 21/67057 15/88.2 |
| 10,985,008 B2 * | 4/2021 | Nishiyama | H01L 21/67051 |

FOREIGN PATENT DOCUMENTS

| | | | | |
|---|---|---|---|---|
| CN | 112643533 A * | 4/2021 | |
| CN | 113195159 A * | 7/2021 | B24B 41/06 |
| JP | 2003243350 A * | 8/2003 | |
| JP | 2006021264 A | 1/2006 | |
| JP | 2018086692 A * | 6/2018 | |

OTHER PUBLICATIONS

Office Action issued in counterpart Japanese patent application No. 2021-163447, dated Apr. 22, 2025.

* cited by examiner

*Primary Examiner* — Katina N. Henson

(74) *Attorney, Agent, or Firm* — Greer Burns & Crain Ltd.

(57) ABSTRACT

A cleaning assembly includes a substrate having a lower surface to be held on a holding unit disposed in a processing apparatus and a cleaning member disposed on an upper surface of the substrate. A suction surface of a conveying unit is cleaned by an action of the cleaning member in a state in which the cleaning assembly is held on the holding unit.

10 Claims, 4 Drawing Sheets

CLEANING ASSEMBLY

BACKGROUND OF THE INVENTION

Field of the Invention

The present invention relates to a cleaning assembly for cleaning a suction surface of a conveying unit of a processing apparatus.

Description of the Related Art

A wafer with a plurality of devices such as integrated circuits (ICs) and large-scale integration (LSI) circuits formed on a front surface thereof partitioned by a plurality of intersecting planned dividing lines (streets) is ground on a back side thereof by a grinding apparatus to be formed into a desired thickness, after which the wafer is divided into individual device chips by a dicing apparatus or a laser processing apparatus, and the divided device chips are used for electric apparatuses such as mobile phones and personal computers.

The grinding apparatus includes a grinding unit including, in a rotatable manner, a chuck table that holds the wafer and a grinding wheel that grinds the wafer held on the chuck table, and also includes a conveying unit that conveys the wafer from a temporary placement table to the chuck table. The grinding apparatus can grind the wafer to a desired thickness with high accuracy (see, for example, Japanese Patent Laid-open No. 2006-021264).

In addition, the conveying unit that conveys the wafer from the temporary placement table to the chuck table includes a suction surface including a plate-like porous member for sucking the back surface of the wafer, and can suck the wafer and can securely convey the wafer to the chuck table.

SUMMARY OF THE INVENTION

However, when foreign matter generated during processing of the wafer (for example, cut swarf of a protective tape disposed on the front surface of the wafer) is adhering to the suction surface of the conveying unit, there arises a problem that, when the sucked and conveyed wafer is placed on the chuck table, the wafer may be damaged by the foreign matter sandwiched between the chuck table and the suction surface of the conveying unit.

Accordingly, it is an object of the present invention to provide a cleaning assembly by which the wafer is prevented from being damage by foreign matter adhering to a suction surface of a conveying unit.

In accordance with an aspect of the present invention, there is provided a cleaning assembly for use in a processing apparatus including a holding unit that holds a workpiece, a processing unit that processes the workpiece, and a conveying unit that has a suction surface for holding the workpiece under suction and that conveys the workpiece. The cleaning assembly includes a substrate having a lower surface to be held under suction on the holding unit, and a cleaning member disposed on an upper surface of the substrate. The suction surface of the conveying unit is cleaned by an action of the cleaning member in a state in which the cleaning assembly is held on the holding unit.

Preferably, the holding unit is a chuck table or a temporary placement table. Preferably, the cleaning member is formed from either of a sponge and a brush.

According to the present invention, foreign matter is prevented from remaining adhering to the suction surface of the conveying unit, so that the workpiece is prevented from being damaged when the workpiece is conveyed to the holding unit and is held thereby.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Cleaning assemblies according to embodiments of the present invention and a processing apparatus to which any one of the cleaning assemblies is applied will be described in detail with reference to the attached drawings.

Figure 1:
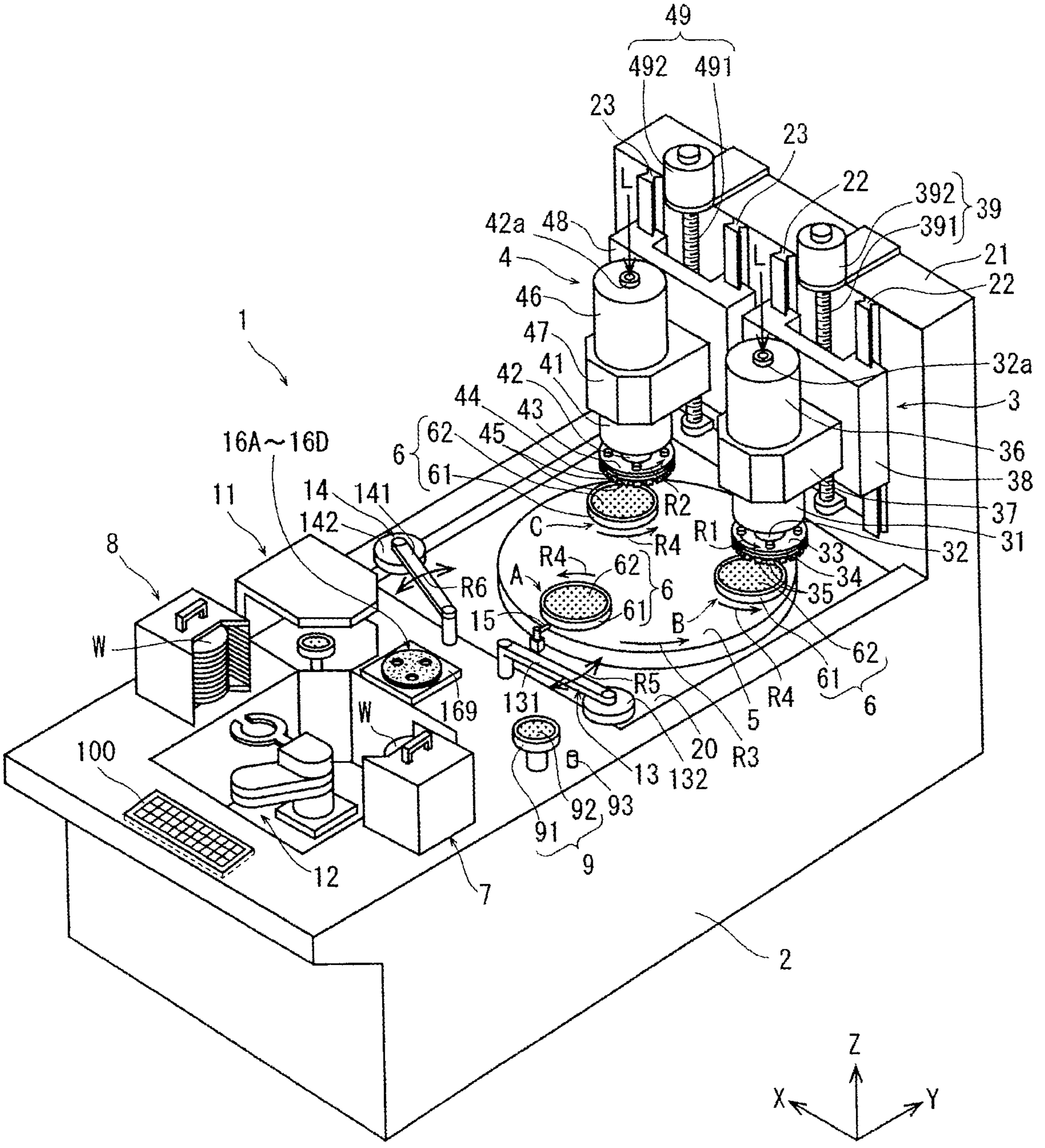
FIG. 1 is an overall perspective view of a grinding apparatus to which any one of cleaning assemblies according to embodiments of the present invention is applied.

FIG. 1 illustrates a grinding apparatus 1 as a processing apparatus having a conveying unit including a suction surface to be cleaned by any one of the cleaning assemblies according to the embodiments of the present invention. The grinding apparatus 1 includes a rectangular parallelepiped apparatus housing 2. In FIG. 1, on a rear end side of the apparatus housing 2, a support wall 21 is erected. On an inside surface of the support wall 21, two pairs of guide rails 22 and 23 extending in a vertical direction (Z-axis direction) are provided. A rough grinding unit 3 as rough grinding means is mounted to the guide rails 22 on one side in a vertically movable manner, and a finish grinding unit 4 as finish grinding means is mounted to the guide rails 23 on the other side in a vertically movable manner.

The rough grinding unit 3 includes a unit housing 31, a wheel mount 33 disposed at a lower end of a rotary shaft 32 rotatably supported by the unit housing 31, a rough grinding wheel 34 that is mounted to the wheel mount 33 and that has a lower surface on which a plurality of grindstones 35 are arranged in an annular pattern, an electric motor 36 that is mounted to an upper end of the unit housing 31 and that rotates the wheel mount 33 in a direction indicated by an arrow R1, and a moving base 38 that supports the unit housing 31 through a support member 37.

The moving base 38 is provided with guided grooves that is slidably fixed to the guide rails 22 provided on the support wall 21, and the rough grinding unit 3 is supported by the guide rails 22 in a vertically movable manner. The grinding apparatus 1 illustrated in FIG. 1 includes a grinding feeding mechanism 39 disposed as lifting and lowering means for lifting and lowering the moving base 38 of the rough grinding unit 3 along the guide rails 22. The grinding feeding mechanism 39 includes a male screw rod 391 that is disposed on the support wall 21 in the vertical direction parallel to the guide rails 22 and that is rotatably supported by the support wall 21, a pulse motor 392 that drives the male screw rod 391 to rotate, and an unillustrated female screw block mounted on the moving base 38 and screwed with the male screw rod 391. With the male screw rod 391 driven by the pulse motor 392 for forward rotation and reverse rotation, the rough grinding unit 3 is moved in the vertical direction.

The finish grinding unit 4 also is configured substantially similarly to the rough grinding unit 3, and includes a unit housing 41, a wheel mount 43 disposed at a lower end of a rotary shaft 42 rotatably supported by the unit housing 41, a finish grinding wheel 44 that is mounted to the wheel mount 43 and that has a lower surface on which a plurality of grindstones 45 are arranged in an annular pattern, an electric motor 46 that is mounted to an upper end of the unit housing 41 and that rotates the wheel mount 43 in a direction indicated by an arrow R2, and a moving base 48 that supports the unit housing 41 through a support member 47.

The moving base 48 is provided with guided grooves that is slidably fixed to the guide rails 23 provided on the support wall 21, and the finish grinding unit 4 is supported by the guide rails 23 in a vertically movable manner. The grinding apparatus 1 in the embodiment illustrated in FIG. 1 includes a grinding feeding mechanism 49 disposed as lifting and lowering means for lifting and lowering the moving base 48 of the finish grinding unit 4 along the guide rails 23. The grinding feeding mechanism 49 includes a male screw rod 491 that is disposed on the support wall 21 in the vertical direction parallel to the guide rails 23 and that is rotatably supported by the support wall 21, a pulse motor 492 for driving the male screw rod 491 to rotate, and an unillustrated female screw block mounted to the moving base 48 and screwed with the male screw rod 491. With the male screw rod 491 driven by the pulse motor 492 for forward rotation and reverse rotation, the finish grinding unit 4 is moved in the vertical direction.

Grinding water supplying means (omitted in illustration) for supplying grinding water L to the grindstones 35 and 45 and the workpiece held on the chuck table 6 described later is connected to rotary shaft ends 32*a* and 42*a* of the rotary shaft 32 and the rotary shaft 42 rotated by the electric motor 36 and the electric motor 46.

The grinding apparatus 1 includes a turntable 5 disposed on the front side of the support wall 21 in such a manner as to be substantially flush with an upper surface of the apparatus housing 2. The turntable 5 is formed in a disk-like shape with a comparatively large diameter, and is rotated as required in a drain pan 20 at the upper surface of the apparatus housing 2 in a direction indicated by an arrow R3 by a rotational drive mechanism omitted in illustration. Three chuck tables 6 are disposed on the turntable 5, as holding means for holding the workpiece at angular intervals of 120 degrees. Each of the chuck tables 6 includes rotational driving means described later, and is configured to be rotatable in a direction indicated by an arrow R4. Each of the chuck tables 6 includes a suction chuck 62 that is formed in a disk-like shape of an air-permeable porous member and forms a holding surface of the chuck table 6, and a frame body 61 surrounding the suction chuck 62.

With the turntable 5 rotated in the direction indicated by the arrow 3R, the three chuck tables 6 disposed on the turntable 5 are sequentially moved to a workpiece conveying-in/conveying-out region A, a rough grinding processing region B, a finish grinding processing region C, the workpiece conveying-in/conveying-out region A, in this order. In the vicinity of the workpiece conveying-in/conveying-out region A inside the drain pan 20, a cleaning water supply nozzle 15 for supplying cleaning water L (the above-described grinding water L can be used as it is) to an upper surface of the suction chuck 62 of the chuck table 6 positioned in the workpiece conveying-in/conveying-out region A.

The grinding apparatus 1 illustrated in FIG. 1 includes a first cassette 7 that is disposed on one side of the workpiece conveying-in/conveying-out region A and that accommodates a plurality of wafers W as workpieces that have not yet been subjected to grinding, a second cassette 8 that is disposed on the other side of the workpiece conveying-in/conveying-out region A and that accommodates a plurality of wafers W that have subjected to grinding, a temporary placement table 9 that is disposed between the first cassette 7 and the workpiece conveying-in/conveying-out region A and that temporarily places thereon the workpiece through suction holding, a cleaning unit 11 disposed between the workpiece conveying-in/conveying-out region A and the second cassette 8, a workpiece conveying-out/conveying-in unit 12 that conveys out the wafer W accommodated in the first cassette 7 onto the temporary placement table 9 and that conveys in the wafer W cleaned by the cleaning unit 11 into the second cassette 8, a first conveying unit 13 that conveys the wafer W held on the temporary placement table 9 onto the chuck table 6 positioned in the workpiece conveying-in/conveying-out region A, and a second conveying unit 14 that conveys the ground wafer W placed on the chuck table 6 positioned in the workpiece conveying-in/conveying-out region A to the cleaning unit 11. The temporary placement table 9 includes a frame body 91 and a holding surface 92 that is surrounded by the frame body 91 and that is formed of an air-permeable porous member. In the vicinity of the temporary placement table 9, a camera 93 is disposed for determining, by imaging the outer edge of the wafer W sucked on the temporary placement table 9, whether or not the center of the wafer W sucked onto the temporary placement table 9 coincides with the center of the temporary placement table 9.

Figure 2:
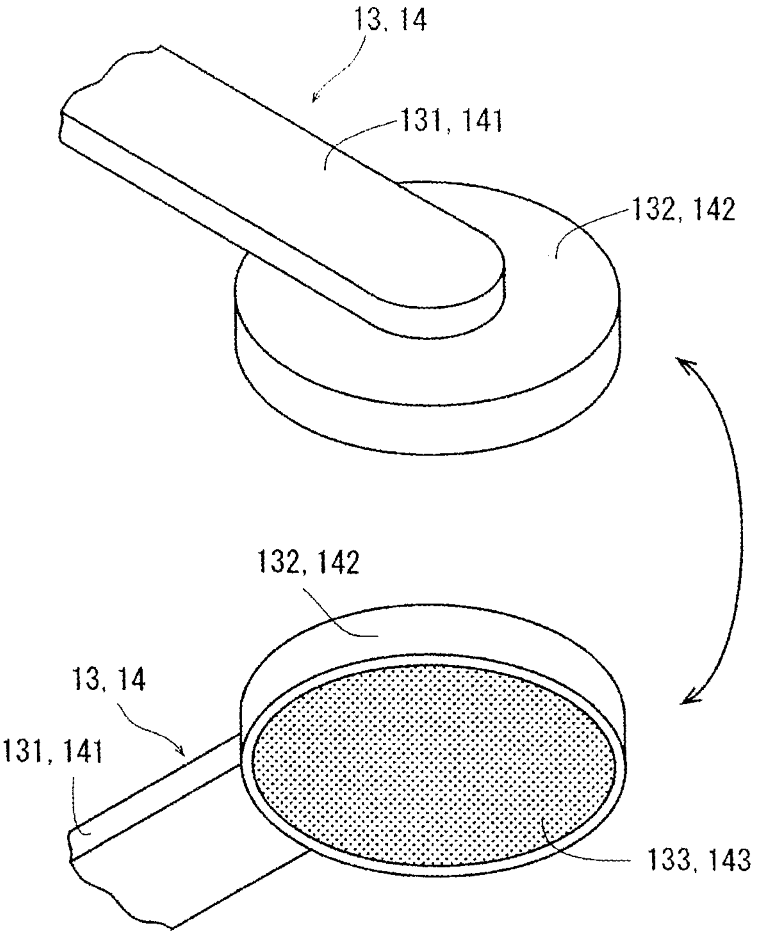
FIG. 2 is a partial enlarged perspective view of a conveying unit disposed in the grinding apparatus depicted in FIG. 1.

The first conveying unit 13 includes an arm member 131 slewed in a direction indicated by an arrow R5 and a suction section 132 formed at a tip of the arm member 131. In addition, the second conveying unit 14 includes an arm member 141 slewed in a direction indicated by an arrow R6 and a suction section 142 formed at a tip of the arm member 141. The first conveying unit 13 and the second conveying unit 14 in the present embodiment have the same configuration. A perspective view of the suction section 132 (suction section 142) constituting the tip part of the first conveying unit 13 (second conveying unit 14) as viewed from above is depicted in the top part of FIG. 2, while a perspective view of the suction section 132 (suction section 142) as viewed from below is depicted in the bottom part of FIG. 2. At a lower surface of the suction section 132 (suction section 142), a suction surface 133 (suction surface 143) formed of an air-permeable porous member is formed. Suction means omitted in illustration is connected to the suction surface 133

(suction surface 143) through the arm member 131 (arm member 141), and a suction negative pressure is generated on the suction surface 133 (suction surface 143). Note that the present invention is not limited to the above-described configuration. For example, one conveying unit serving as both the first conveying unit 13 and the second conveying unit 14 may be provided.

On the near side of the apparatus housing 2 in which the workpiece conveying-out/conveying-in unit 12 is disposed, a control unit 100 including an operation panel for instructing a grinding work or designating processing conditions is disposed. The control unit 100 includes a central processing unit (CPU) that performs arithmetic processing according to a control program, a read only memory (ROM) that stores the control program and the like, a readable-writable random access memory (RAM) as storage means for storing the results of arithmetic processing and the like, an input interface and an output interface (all of these are omitted in illustration). Each operating section of the above-described grinding apparatus 1 is controlled by the control unit 100 thus configured.

The grinding apparatus 1 illustrated in FIG. 1 generally has the above-described configuration. Cleaning assemblies each configured to clean the suction surface 133 of the first conveying unit 13 and the suction surface 143 of the second conveying unit 14 that are disposed in the grinding apparatus 1 and actions of the cleaning assemblies will be described below.

Figure 3A:
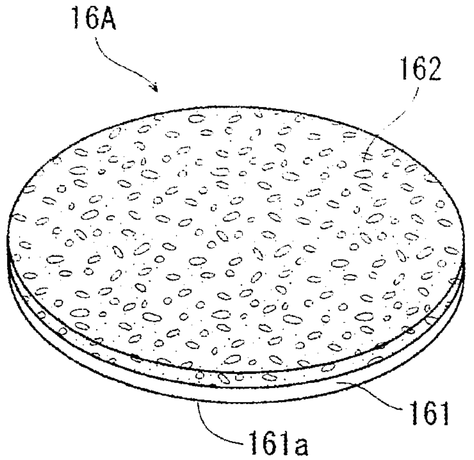
FIG. 3A is a perspective view of a first cleaning assembly.

FIGS. 3A to 3D illustrate cleaning assemblies according to four embodiments of the present invention. FIG. 3A depicts a first cleaning assembly 16A as a first embodiment. The first cleaning assembly 16A includes a substrate 161 having a lower surface 161*a* which is set in a size corresponding to the size of the suction chuck 62 of the chuck table 6 and which is held under suction by the suction chuck 62, and a cleaning member 162 disposed on an upper surface of the substrate 161. The substrate 161 is, for example, a hard resin circular plate, and the cleaning member 162 is a spongy pad adhering to the upper surface of the substrate 161 by an adhesive or the like.

Figure 3B:
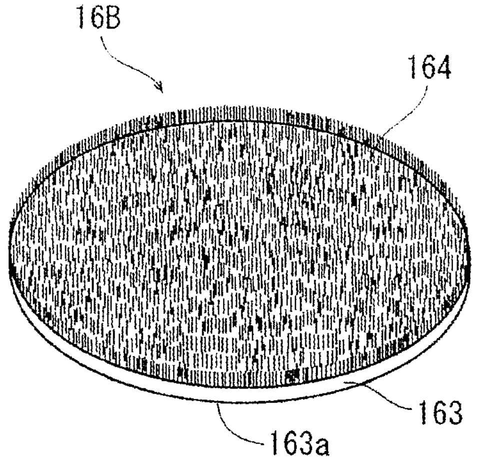
FIG. 3B is a perspective view of a second cleaning assembly.

FIG. 3B depicts a second cleaning assembly 16B as a second embodiment. The second cleaning assembly 16B includes a substrate 163 having a lower surface 163*a* which is set in a size corresponding to the size of the suction chuck 62 of the chuck table 6 and which is held under suction by the suction chuck 62, and a cleaning member 164 disposed on an upper surface of the substrate 163. The substrate 163 is a circular plate of the same quality as that of the substrate 161, and the cleaning member 164 is a brush-like member in which hairs are transplanted to the upper surface of the substrate 163 in a uniform density.

Figure 3C:
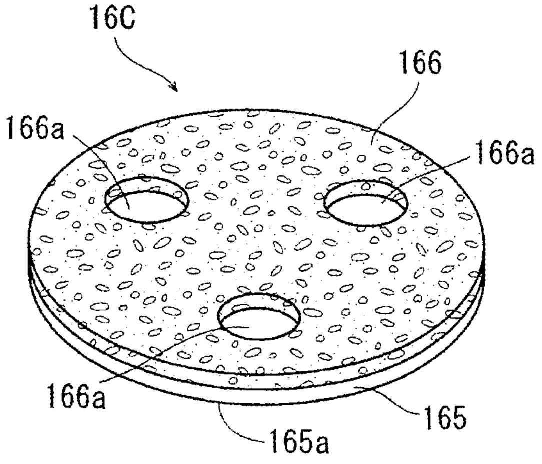
FIG. 3C is a perspective view of a third cleaning assembly.

FIG. 3C depicts a third cleaning assembly 16C as a third embodiment. The third cleaning assembly 16C includes a substrate 165 having a lower surface 165*a* which is set in a size corresponding to the size of the suction chuck 62 of the chuck table 6 and which is held by the suction chuck 63, and a cleaning member 166 disposed on an upper surface of the substrate 165. The substrate 165 is a circular plate of the same quality as that of the substrate 161, and the cleaning member 166 is a spongy pad adhering to the upper surface of the substrate 165 by an adhesive. The cleaning member 166 in the present embodiment is a pad member of the same quality as that of the cleaning member 162 disposed in the first cleaning assembly 16A, but is formed with three suction holes 166*a* for sucking by a conveying arm 18 having suction means (see FIG. 4A) described later, and by the suction holes 166*a*, the upper surface of the substrate 165 is exposed to the upper side.

Figure 3D:
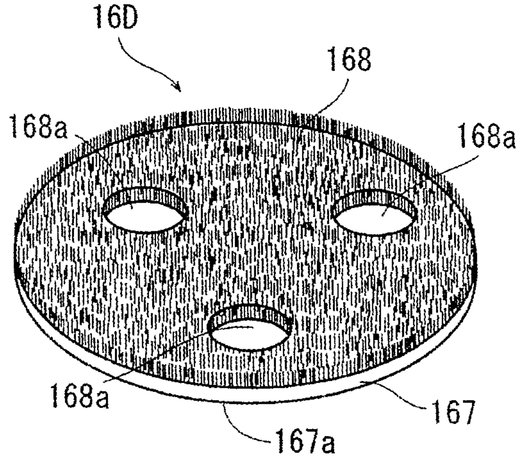
FIG. 3D is a perspective view of a fourth cleaning assembly.

FIG. 3D depicts a fourth cleaning assembly 16D as a fourth embodiment. The fourth cleaning assembly 16D includes a substrate 167 having a lower surface 167*a* which is set in a size corresponding to the size of the suction chuck 62 of the chuck table 6 and which is held by the suction chuck 62, and a cleaning member 168 disposed on an upper surface of the substrate 167. The substrate 167 is a circular plate of the same quality as that of the substrate 161, and the cleaning member 168 is a brush-like member in which hairs are transplanted to the upper surface of the substrate 167. The cleaning member 168 is a brush-like member of the same quality as that of the cleaning member 164 disposed in the second cleaning assembly 16B, but, for suction by the conveying arm 18 (see FIG. 4A) described later, is formed with three suction regions 168*a* where the brush-like cleaning member 168 is not hair-transplanted, and, in the suction regions 168*a*, the upper surface of the substrate 167 is exposed to the upper side. Note that the above-described substrates 161, 163, 165, and 167 are not limited to the hard resin plates, and may be, for example, metallic plates, glass plates, or the like.

Figure 4A:
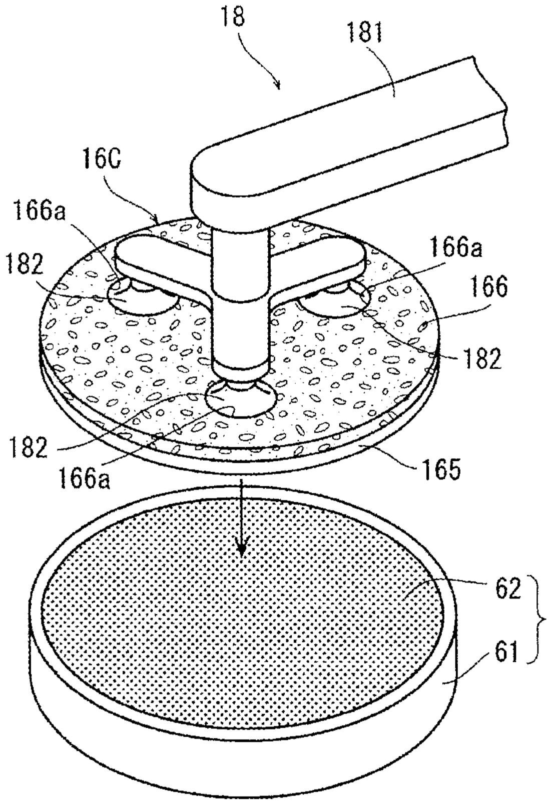
FIG. 4A is a perspective view depicting the manner in which the third cleaning assembly is held on a chuck table.

The cleaning assemblies 16A to 16D can be stored, for example, on the upper surface of the apparatus housing 2 of the grinding apparatus 1 in a region between the cleaning unit 11 and the temporary placement table 9, as depicted in FIG. 1. The storage is conducted by placing one of the cleaning assemblies 16A to 16D on a storage plate 169. In describing hereinafter the actions of the cleaning assemblies according to the embodiments of the present invention, it is assumed that the third cleaning assembly 16C of the cleaning assemblies 16A to 16D is selected. The third cleaning assembly 16C is formed with suction holes 166*a* as depicted in FIG. 3C, and, by use of a conveying arm 18 as depicted in FIG. 4A, the third cleaning assembly 16C can be conveyed from the storage plate 169 to the chuck table 6 positioned in the workpiece conveying-in/conveying-out region A. Note that, while the conveying arm 18 is omitted in FIG. 1 for convenience of explanation, the center of slewing of the conveying arm 18 is set at an intermediate position between the first conveying unit 13 and the second conveying unit 14, for example.

The conveying arm 18 includes an arm member 181 and three suction members 182 disposed at a tip part of the arm member 181. An unillustrated suction means is connected to the suction members 182 through the arm member 181, and, by operating the suction means, a negative pressure is generated in the suction members 182. The suction members 182 are formed in such a manner as to correspond to the three suction holes 166*a* formed in the cleaning member 166 of the third cleaning assembly 16C. In other words, the suction member 182 of the conveying arm 18 is positioned at the suction holes 166*a* of the third cleaning assembly 16 and is sucked, and, by putting the arm member 181 into lifting and lowering and a slewing operation, the third cleaning assembly 16C is conveyed from the storage plate 169 to the chuck table 6 positioned in the workpiece conveying-in/conveying-out region A and is placed on the suction chuck 62, to be held under suction.

Figure 5:
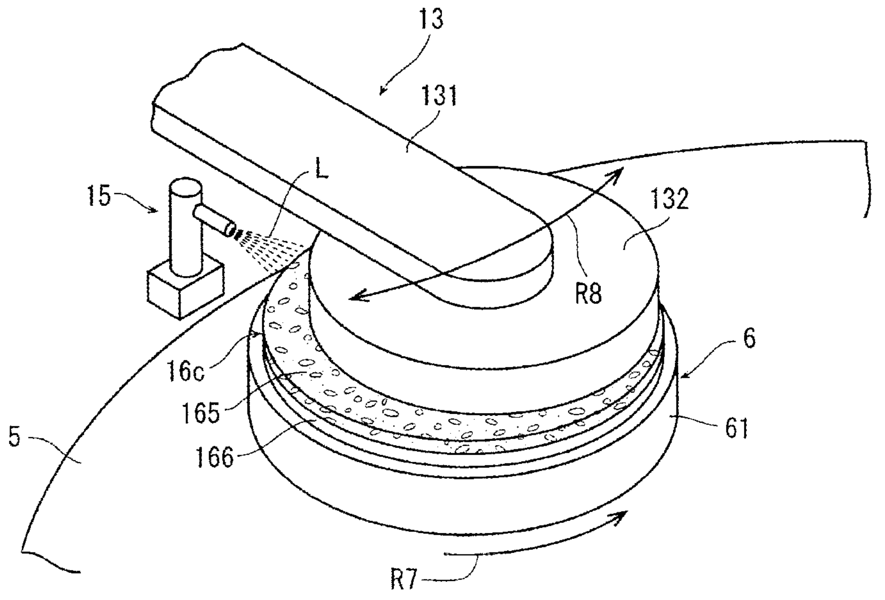
FIG. 5 is a perspective view depicting the manner in which a suction surface of a conveying unit is cleaned by the cleaning assembly depicted in FIG. 4A.

When the third cleaning assembly 16C is held on the chuck table 6, the first conveying unit 13 is slewed, as depicted in FIG. 5, to bring the suction surface 133 of the suction section 132 into contact with an upper surface of the cleaning member 166 of the third cleaning assembly 16C. Together with this, the chuck table 6 is rotated in a direction indicated by an arrow R7, and the arm member 131 of the first conveying unit 13 is oscillated in a direction indicated by an arrow R8. Thus, in a state in which the cleaning assembly 16C is held on the chuck table 6, the suction surface 133 of the first conveying unit 13 is cleaned by an action of the cleaning member 166. Further, in the present embodiment, cleaning water L is jetted from the cleaning water supply nozzle 15 disposed in the vicinity of the workpiece conveying-in/conveying-out region A. By the action of the cleaning water L, the suction surface 133 of the first conveying unit 13 is more effectively cleaned, and foreign matter having adhered to the suction surface 133 is removed. Such cleaning is carried out at fixed intervals or at freely-selected timings, and, since the foreign matter does not adhere to the suction surface 133, the wafer W is prevented from being damaged or broken when the wafer W and the like are conveyed to the chuck table 6.

Note that, while in the above-described embodiments, the conveying arm 18 is used in conveying the cleaning assemblies 16A to 16D from the storage plate 169 for storing the cleaning assemblies 16A to 16D, onto the chuck table 6 to place the cleaning assemblies 16A to 16D thereon, the present invention is not limited to this, and an operator may manually place the cleaning assemblies 16A to 16D on the chuck table 6. In that case, the suction holes **166*a* and the suction regions 168*a* formed in the third cleaning assembly 16C and the fourth cleaning assembly 16D depicted in FIG. 3C and FIG. 3D, respectively, are unnecessary, and, instead, the cleaning assemblies 16A and 16B depicted in FIG. 3A and FIG. 3**B, respectively, can be used.

Figure 4B:
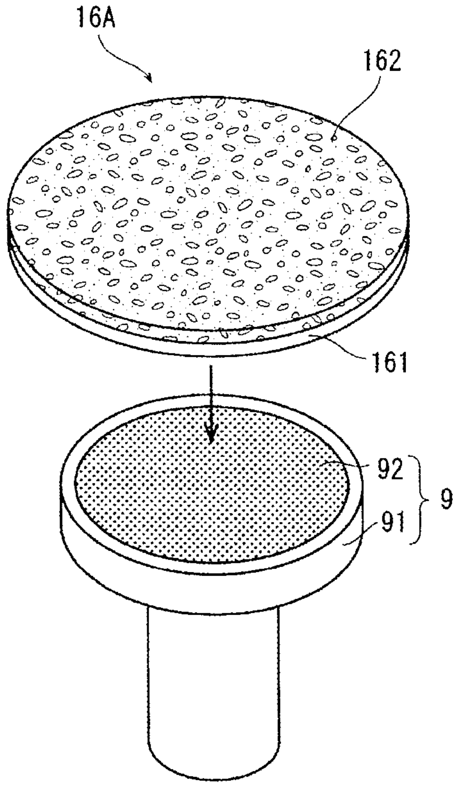
FIG. 4B is a perspective view depicting the manner in which the first cleaning assembly is held on a temporary placement table.

In addition, while in the above-described embodiment, the suction surface 133 of the first conveying unit 13 is cleaned by use of the cleaning assembly 16C held on the chuck table 6, cleaning of the suction surface 143 of the suction section 142 of the second conveying unit 14 can also be carried out. Further, in the above-described embodiments, by use of the chuck table 6 as holding means according to the embodiments of the present invention, the cleaning assemblies 16A to 16D are each held, and cleaning of the suction surface 133 of the suction section 132 of the first conveying unit 13 is carried out, but the present invention is not limited to this. For example, as depicted in FIG. 4B, by use of the temporary placement table as holding means according to an embodiment of the present invention, the cleaning assemblies 16A to 16D can be placed on the holding surface 92 of the temporary placement table 9 and held under suction, the suction surface 133 of the first conveying unit 13 can be put into contact therewith from above the temporary placement table 9, and the suction surface 133 can be cleaned by oscillation of the first conveying unit 13, as described based on FIG. 5. In that case, it is sufficient if the sizes of the substrates 161, 163, 165, and 167 constituting the cleaning assemblies 16A to 16D, respectively, are each equal to or greater than that of the temporary placement table 9, and the sizes of the substrates 161, 163, 165, and 167 each do not need to be a size corresponding to the chuck table 6.

Further, while the grinding apparatus 1 is illustrated as a processing apparatus to which the cleaning assemblies according to the embodiments of the present invention are applied, the present invention is not limited to this. If the processing apparatus includes holding means for holding the workpiece and a conveying unit that has a suction surface for sucking the workpiece and that conveys the workpiece, the kind of the processing apparatus is not particularly limited to any kind.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A cleaning assembly for use in a processing apparatus including a holding unit that holds a workpiece, and a processing unit that processes the workpiece, the cleaning assembly comprising:

a conveying unit that has a suction surface for holding the workpiece under suction and that conveys the workpiece;

a substrate having a constant thickness and a lower surface which is held under suction on an upper surface of a chuck table of the holding unit, wherein the lower surface of the substrate is held in contacting relationship with the upper surface of the chuck table; and a cleaning member formed from a brush implanted in an upper surface of the substrate, wherein the suction surface of the conveying unit is cleaned by an action of the cleaning member in a state in which the cleaning assembly is held on the holding unit.

2. The cleaning assembly according to claim 1, wherein the lower surface of the substrate has a size corresponding to a size of a suction chuck of the chuck table.

3. The cleaning assembly according to claim 1, wherein the cleaning member is formed with at least one suction hole.

4. The cleaning assembly according to claim 3, wherein the cleaning assembly is conveyed to the chuck table by a conveying arm with an arm member and at least one suction member disposed at a tip part of the arm member, such that the at least one suction member is positioned at the at least one suction hole.

5. The cleaning assembly according to claim 1, further comprising a cleaning water supply nozzle for supplying cleaning water to the cleaning member.

6. The cleaning assembly according to claim 1, wherein a diameter of the substrate is the same as a diameter of the cleaning member.

7. The cleaning assembly according to claim 1, wherein a center of the cleaning member is aligned with a center of the substrate.

8. The cleaning assembly according to claim 1, wherein the substrate is a hard resin circular plate.

9. A cleaning assembly for use in a processing apparatus including a holding unit that holds a workpiece, and a processing unit that processes the workpiece, the cleaning assembly comprising:

a conveying unit that has a suction surface for holding the workpiece under suction and that conveys the workpiece;

a substrate having a constant thickness and a lower surface which is held under suction on an upper surface of a chuck table of the holding unit, wherein the lower surface of the substrate is held in contacting relationship with the upper surface of the chuck table; and a cleaning member disposed on an upper surface of the substrate, wherein the suction surface of the conveying unit is cleaned by an action of the cleaning member in a state in which the cleaning assembly is held on the holding unit, and wherein the cleaning member is formed with at least one suction hole, such that the cleaning assembly is conveyed to the chuck table by a conveying arm with an arm member and at least one suction member disposed at a tip part of the arm member, such that the at least one suction member is positioned at the at least one suction hole.

10. A cleaning assembly for use in a processing apparatus including a holding unit that holds a workpiece, and a processing unit that processes the workpiece, the cleaning assembly comprising:

a conveying unit that has a suction surface for holding the workpiece under suction and that conveys the workpiece;

a substrate having a constant thickness and a lower surface which is held under suction on an upper surface of a chuck table of the holding unit, wherein the lower surface of the substrate is held in contacting relationship with the upper surface of the chuck table; and a cleaning member formed from a sponge pad adhered to an upper surface of the substrate, wherein the suction surface of the conveying unit is cleaned by an action of the cleaning member in a state in which the cleaning assembly is held on the holding unit.

* * * * *